United States Patent
Lo et al.

(10) Patent No.: US 7,294,021 B1
(45) Date of Patent: Nov. 13, 2007

(54) TELEVISION CARD

(75) Inventors: Shih-Pin Lo, Taipei (TW); Li-Hsiang Liao, Taipei (TW); Chin-Yi Wu, Taipei (TW); Chun-Kai Chan, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/713,037

(22) Filed: Mar. 2, 2007

(30) Foreign Application Priority Data

Apr. 11, 2006 (TW) .............................. 95112881 A

(51) Int. Cl.
*H01R 24/00* (2006.01)
(52) U.S. Cl. ........................................ 439/660; 439/59
(58) Field of Classification Search ................ 439/660, 439/59–61; 361/685; 235/492; 386/95; 348/552; 725/143; 710/300–301
See application file for complete search history.

(56) References Cited

U.S. PATENT DOCUMENTS

| 5,162,675 | A | * | 11/1992 | Olsen et al. .................. 326/37 |
| 5,715,146 | A | * | 2/1998 | Hoppal ........................ 361/796 |
| 5,928,347 | A | * | 7/1999 | Jones .......................... 710/305 |
| 6,129,556 | A | * | 10/2000 | Sihn et al. ..................... 439/61 |
| 6,356,959 | B1 | * | 3/2002 | Thomas et al. ................ 710/2 |
| 6,375,495 | B1 | * | 4/2002 | Szeto ....................... 439/540.1 |
| 6,564,274 | B1 | * | 5/2003 | Heath et al. ................. 710/105 |
| 6,607,136 | B1 | * | 8/2003 | Atsmon et al. ............. 235/492 |
| 2005/0149767 | A1 | * | 7/2005 | Fei ............................... 713/300 |
| 2006/0046534 | A1 | * | 3/2006 | Birmingham .............. 439/76.1 |
| 2007/0054735 | A1 | * | 3/2007 | Palermo ....................... 463/30 |
| 2007/0141870 | A1 | * | 6/2007 | Chen et al. ................... 439/92 |

* cited by examiner

*Primary Examiner*—Michael C. Zarroli
(74) *Attorney, Agent, or Firm*—Birch, Stewart, Kolasch & Birch, LLP

(57) ABSTRACT

A television card is provided to couple to a computer to transform input audio/video signals into output computer-displayable signals. The television card includes a card body, an Express Card connector and a USB connector. The Express Card connector is disposed on the card body. The USB connector is disposed on the card body or coupled to the card body by a USB cable. Either one of the Express Card connector or the USB connector is connected electrically to the computer.

8 Claims, 2 Drawing Sheets

TELEVISION CARD

RELATED APPLICATIONS

The present application is based on, and claims priority from, Taiwan Application Serial Number 95112881, filed on Apr. 11, 2006, the disclosure of which is hereby incorporated by reference herein in its entirety.

BACKGROUND

1. Field of Invention

The present invention relates to a television card. More particularly, the present invention relates to a television card with an Express Card connector and a USB connector.

2. Description of Related Art

Using computer to receive and display TV signals has become a popular computer application. Once a television card is applied to a computer, cable or wireless TV program signals can be transformed into signals that can be displayed by a computer such that a computer user does not have to buy an extra TV for watching TV programs.

There are several types of communication interfaces for computer systems, including interfaces for a television card, such as the television card of the Express Card Connector or USB connector. For a television card supplier, one television card of one more different communication connector, a different type of product, needs more marketing, research, development and manufacturing costs. It would be disadvantageous to manage television cards with different types of communication connectors.

SUMMARY

It is therefore an objective of the present invention to provide a TV card with a USB connector and an Express card connector.

In accordance with the foregoing and other objectives of the present invention, a television card may be applied to a computer to transform input audio/video signals into output computer-displayable signals. The television card includes a card body, an Express Card connector and a USB connector. The Express Card connector is disposed on the card body. The USB connector is disposed on the card body or coupled to the card body by a USB cable. Either the Express Card connector or the USB connector is connected electrically to the computer.

Thus, a TV card of the present invention has two types of connectors—a USB connector and an Express Card connector. A user can use either one to couple to a computer instead of buying two TV cards. For a TV card supplier, this type of device can save half the marketing, research, development and manufacturing costs.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
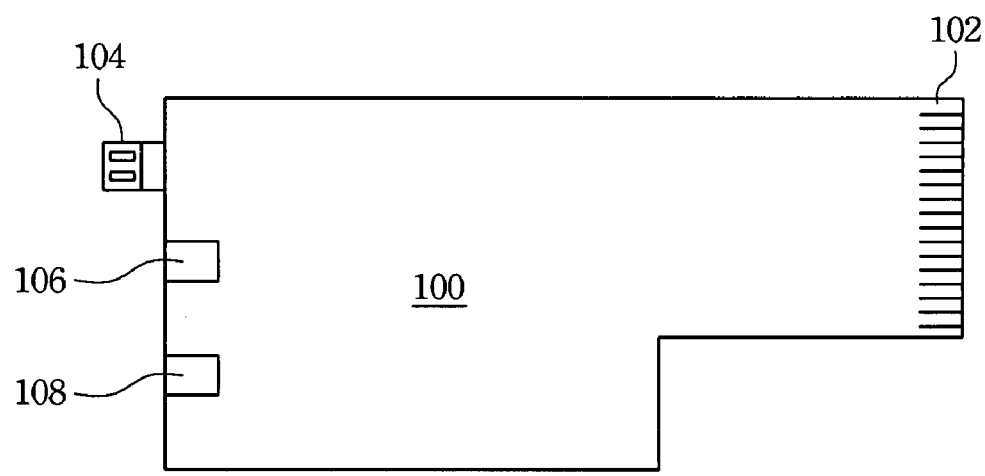
FIG. 1 illustrates a top view of a TV card according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a top view of a TV card according to one preferred embodiment of this invention. The TV card of this embodiment is designed based on USB architecture, and can be connected electrically to a computer by an Express Card connector 102 or a USB connector 104. The Express Card connector 102 and the USB connector 104 are disposed on the card body 100. The card body 100 further includes a NTSC/PAL connector 106 to couple to a TV cable, and an audio/video connector 108 to couple to an electronic audio/video device.

Figure 2:
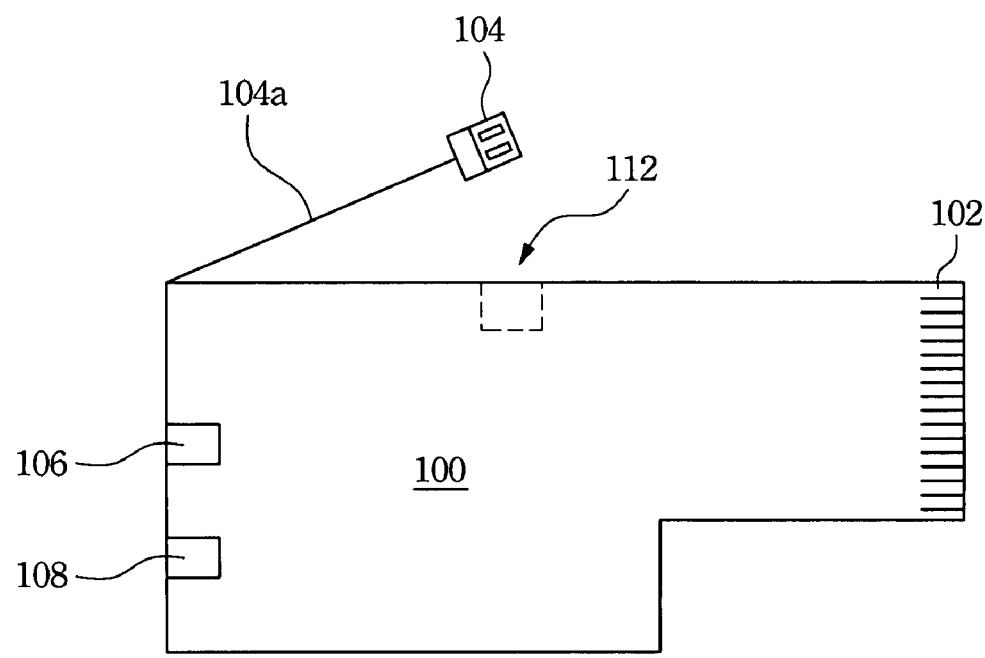
FIG. 2 illustrates a top view of a TV card according to another preferred embodiment of this invention.

FIG. 2 illustrates a top view of a TV card according to another preferred embodiment of this invention. The TV card of this embodiment is also designed based on USB architecture, and can be connected electrically to a computer by an Express Card connector 102 or a USB connector 104. Compared to the previous embodiment illustrated in FIG. 1, the difference is that the USB connector 104 is coupled to the card body 100 by a USB cable 104a. The card body 100 further includes a slot 112 for accommodating the idle USB connector 104. The card body 100 further includes a NTSC/PAL connector 106 to couple to a TV cable, and an audio/video connector 108 to couple to an electronic audio/video device.

Figure 3:
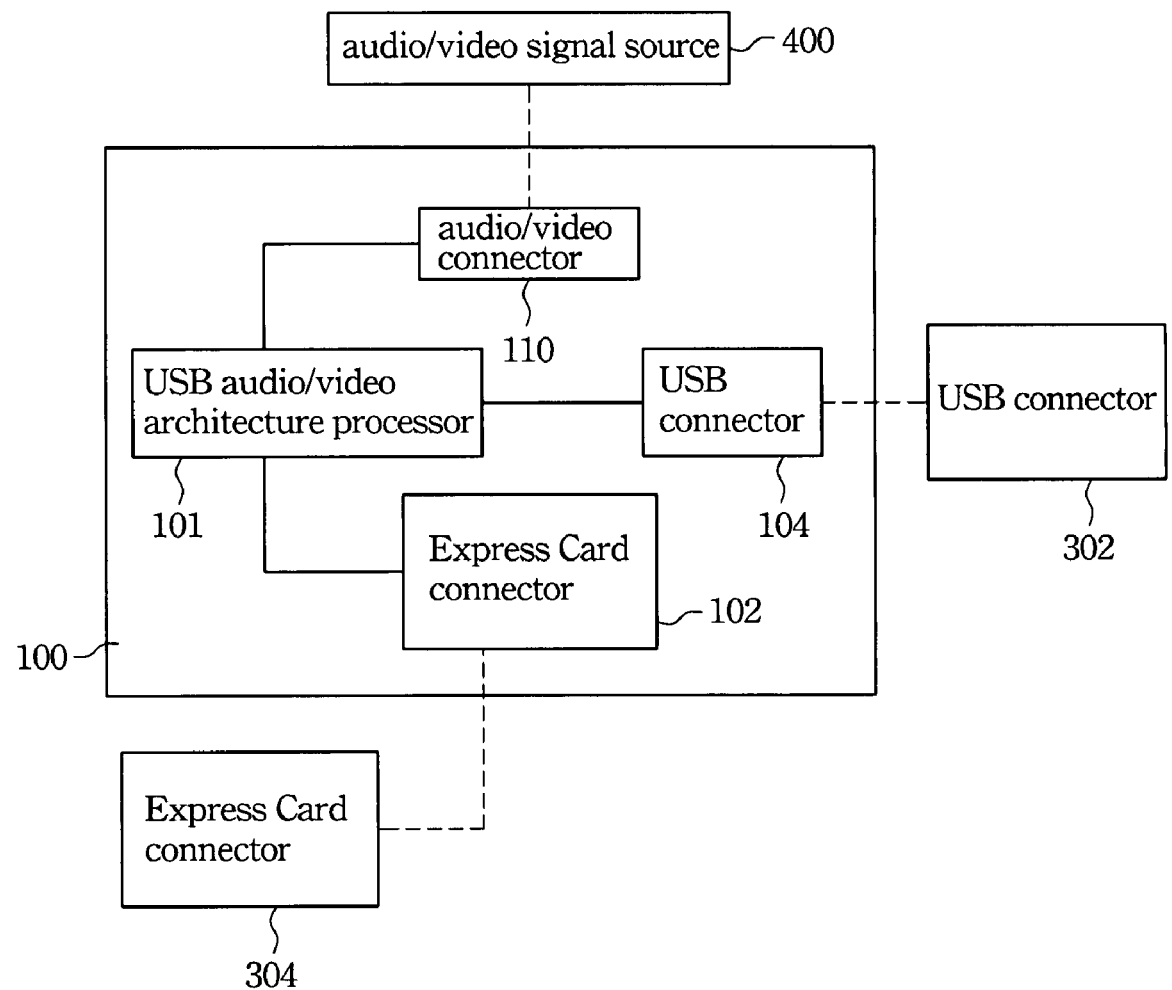
FIG. 3 illustrates a block diagram according this invention.

FIG. 3 illustrates a block diagram according this invention. The solid line in this block diagram represents a physical electrical connection. The dashed-line represents a detachable electrical connection (such as an electrical connection made by a connector). A USB audio/video architecture processor 101 is a signal processing and transmitting controller of a TV card. The USB audio/video architecture processor 101 is respectively coupled to an audio/video connector 110, a USB connector 104 and an Express Card connector 102. The audio/video connector 110 can be an above-mentioned NTSC/PAL connector 106, audio/video connectors 108 or other audio/video connectors for receiving audio/video signals from an audio/video signal source 400. The Express Card connector 102 can be coupled to another Express Card connector 304 on a computer terminal. The USB connector 104 can be coupled to another USB connector 302 of a computer terminal. In this preferred embodiment, a TV card can be coupled to a computer by an Express Card connector 102 or a USB connector 104 so as to receive audio/video signals from an audio/video signal source 400 and transform input audio/video signals into output computer-displayable signals.

According to the preferred embodiments, a TV card of the present invention has two types of connectors, a USB connector and an Express Card connector. A user can use either one to couple to his/her computer instead of buying two TV cards. A TV card supplier can save half of marketing, research, development and manufacturing costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A television card, coupled to a computer, for transforming input audio/video signals into output computer-displayable signals, the television card comprising:
   a card body;
   an Express Card connector, coupled to the card body; and
   a USB connector, coupled to the card body, wherein either the Express Card connector or the USB connector is connected electrically to the computer.

2. The television card of claim 1, wherein the card body further includes an NTSC/PAL connector to couple to a TV cable.

3. The television card of claim 1, wherein the card body further includes an audio/video connector to couple to an electronic audio/video device.

4. The television card of claim 1, wherein the Express Card connector is disposed on the card body.

5. The television card of claim 1, wherein the USB connector is disposed on the card body.

6. The television card of claim 1 further comprising a USB cable, wherein the USB connector is coupled to the card body by the USB cable.

7. The television card of claim 6, wherein the USB cable is a shrinkable cable.

8. The television card of claim 1, wherein the card body further includes a storage slot for accommodating the idle USB connector.

* * * * *